Figure 1:
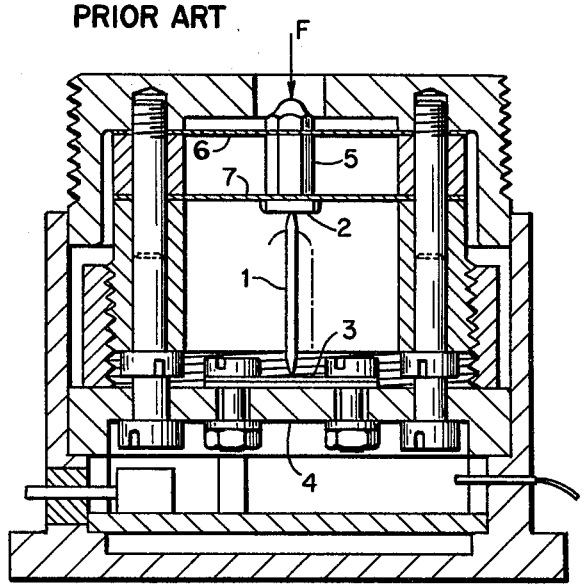

United States Patent [19]

Corbett

[11] 4,439,705
[45] Mar. 27, 1984

[54] OSCILLATING CRYSTAL TRANSDUCER SYSTEMS WITH SYMMETRICAL TEMPERATURE COMPENSATOR

[76] Inventor: James P. Corbett, 923 Palermo Dr., Santa Barbara, Calif. 93105

[21] Appl. No.: 328,520

[22] Filed: Dec. 8, 1981

[51] Int. Cl.³ .............................................. G01B 7/16
[52] U.S. Cl. ..................................... 310/338; 73/765; 331/65
[58] Field of Search ................ 73/703, 708, 497, 766, 73/765; 310/312, 315, 319, 321, 323, 331, 332, 338, 342, 346, 353, 328; 331/65, 66, 116, 158

[56] References Cited

U.S. PATENT DOCUMENTS

| | | | |
|---|---|---|---|
| 3,225,226 | 12/1965 | Kawakami | 310/353 |
| 3,285,074 | 11/1966 | Elazar | 73/517 |
| 3,541,849 | 11/1970 | Corbett | 310/319 |
| 3,888,115 | 6/1975 | Schwartz | 73/88.5 R |
| 4,020,448 | 4/1977 | Corbett | 340/85 |
| 4,100,811 | 7/1978 | Cullen et al. | 73/654 |
| 4,126,801 | 11/1978 | Corbett | 310/328 |
| 4,166,229 | 8/1979 | de Reggi et al. | 310/337 |
| 4,175,243 | 11/1979 | Corbett | 310/338 |
| 4,338,575 | 7/1982 | Hartemann | 331/65 |

Primary Examiner—William H. Beha, Jr.
Assistant Examiner—D. S. Rebsch

[57] ABSTRACT

A force or fluid pressure transducer comprises two plate-like crystals. The force is applied to the first of the two crystals in a direction generally along the crystal faces by two seatings situated at opposing edges of the crystal.

An oscillating portion of this first crystal changes its frequency by an amount which is a very accurate measure of the force, providing the ambient temperature of the instrument remains constant.

The present invention resides in a second crystal secured to the first crystal at particular force insensitive points, there being very small spacing between the two crystals. The second crystal sustains a negligibly small amount of the force and hence a similar oscillating portion of this second crystal undergoes negligibly small frequency change.

Means are provided for adjusting the steady-state temperature behavior of one crystal with respect to that of the other in order to remove residual errors.

The instrument output signal is formed by generating the difference frequency between the two crystals. This difference frequency changes only negligibly when the instrument is subjected to ambient temperature changes and hence provides superior performance to earlier inventions.

21 Claims, 16 Drawing Figures

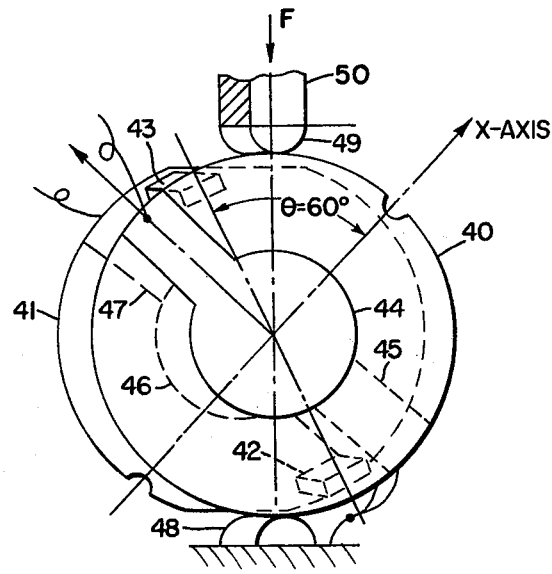
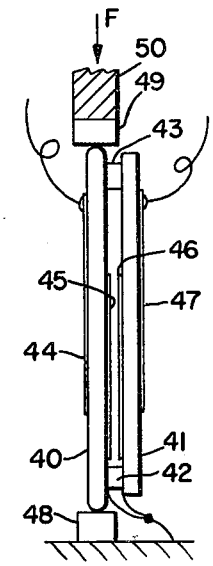
Fig.4  Fig.5
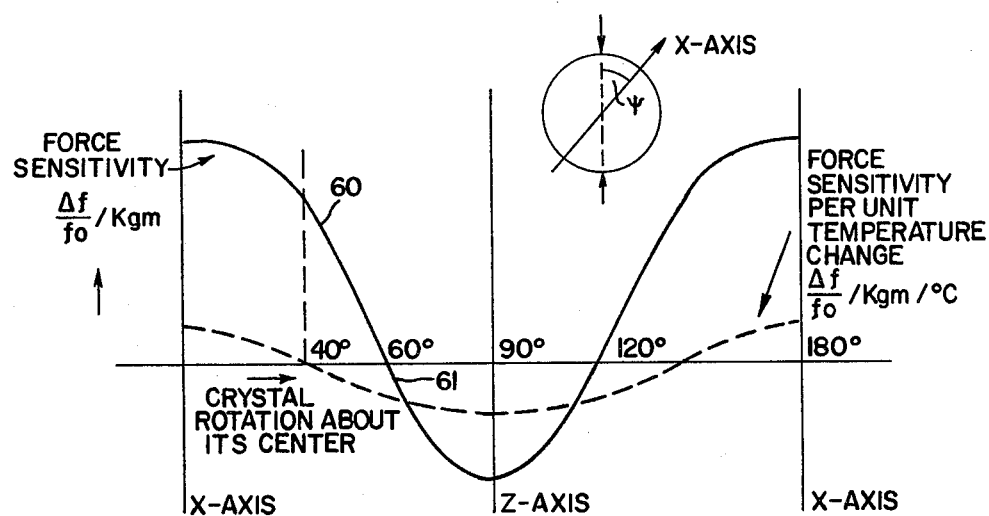
Fig.6

OSCILLATING CRYSTAL TRANSDUCER SYSTEMS WITH SYMMETRICAL TEMPERATURE COMPENSATOR

This invention relates to oscillating crystal transducer systems of the types described in my U.S. Pat. Nos. 3,541,849 3,891,870 4,020,448 4,067,241 4,126,801 & 4,175,243 also my patent applications 264,962/81 276,454/81 & 310,734/81 also my Disclosure No. 104,402 dated Nov. 20th, 1981, filed in the U.S. Patent Office Disclosure Document Program.

With earlier oscillating crystal force and pressure transducers, although very accurate in all other respects, a continuing problem has been that, in spite of a number of special measures to combat it, it has remained somewhat difficult and expensive to ensure that no change in the transducer output signal took place when the ambient temperature of the instrument changed.

It is the purpose of the present invention to provide means whereby only negligibly small instrument output signal changes occur in response to ambient temperature changes.

According to the present invention a force or fluid pressure transducer comprises two plate-like crystals. The force to be measured is applied to the first of the two crystals by two seatings situated at opposing edges of the crystal in a direction generally along its faces.

An oscillating portion of this first crystal changes its frequency by an amount which is a very accurate measure of the force, provided the ambient temperature of the instrument remains constant.

The present invention resides in a second crystal secured to the first crystal at particular force insensitive points, there being very small spacing between the two crystals. The second crystal sustains a negligibly small amount of the force and hence a similar oscillating portion in this second crystal undergoes negligible frequency change.

The instrument output signal is formed by generating the difference frequency between the two crystals. This difference frequency changes only negligibly when the instrument is subjected to rapid temperature changes because of the very close proximity of the two crystals to one another.

As sometimes occurs in manufacture, the two crystals are not identical in all respects and it is also the purpose of this invention to provide means of adjustment to one or other of them to cause their ambient temperature characteristics to become identically matched.

The new transducer is thus superior to earlier transducers employing the oscillating quartz principle.

Reference will hereinafter be made to the accompanying drawings which illustrate various embodiments of the invention by way of example;

FIG. 1. shows a cross-sectional elevation of an oscillating crystal transducer containing a single crystal having in it a single oscillating portion.

Figure 2:
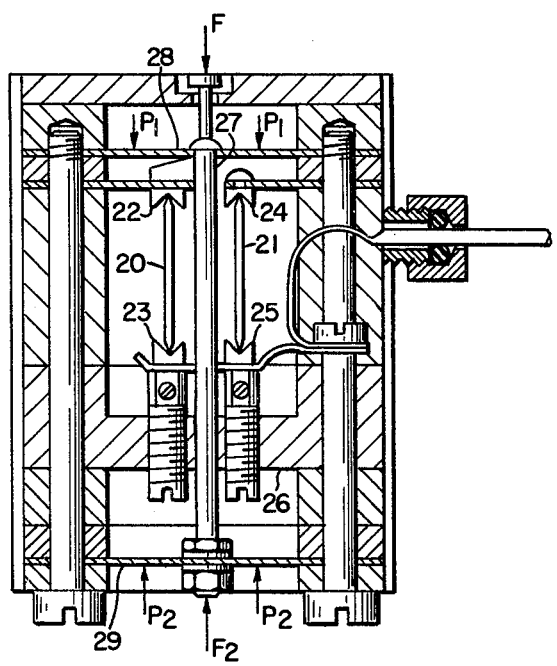

FIG. 2. shows a cross-sectional elevation of an oscillating crystal transducer containing a matched pair of crystals each secured in separate seatings.

Figure 3:
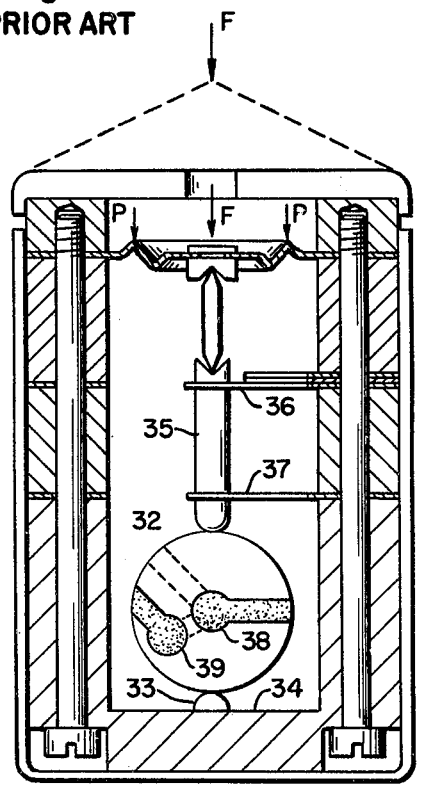

FIG. 3. shows a cross-sectional elevation of an oscillating crystal transducer containing a single crystal having in it two oscillating portions.

FIG. 4. shows a perspective sketch of the present invention comprising a pair of crystals secured one to the other and sitting in a single pair of seatings.

FIG. 5. shows a side elevation of the arrangement shown in FIG. 4.

FIG. 6. shows a characteristic curve of force sensitivity versus the angle of rotation of a crystal about its center.

Figure 7:
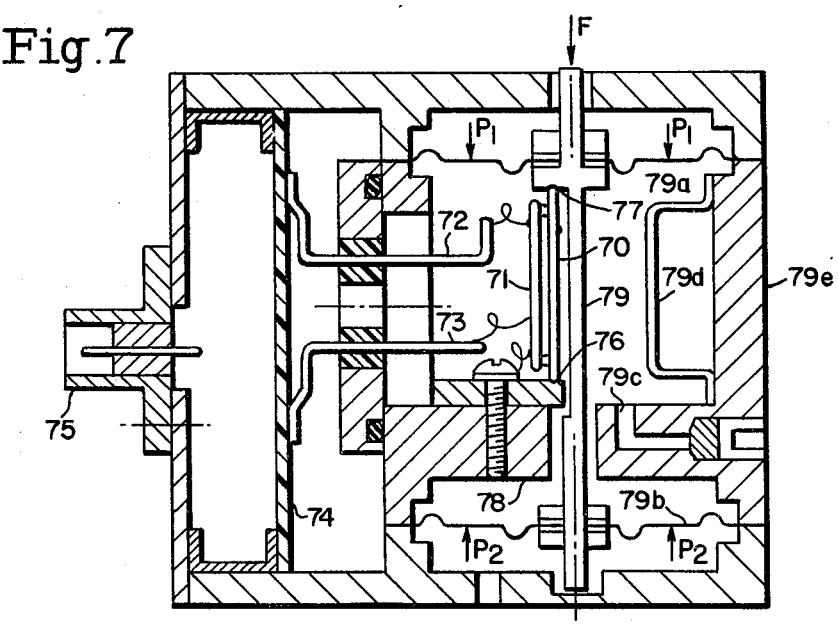

FIG. 7. shows a cross-sectional elevation of a preferred transducer housing embodying the new crystal arrangement.

Figure 8:
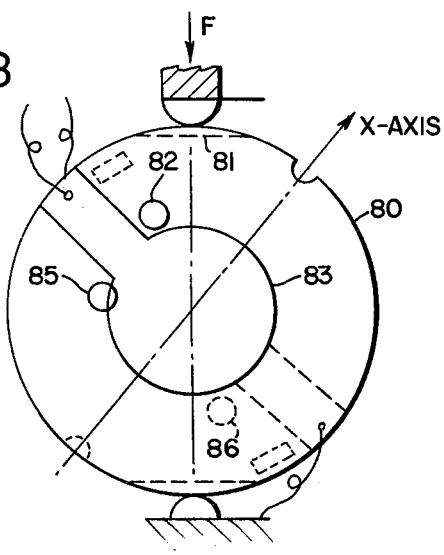

FIG. 8. shows an elevation view of a pair of crystals according to the invention whereon small masses are secured at points on the surface of one of the two crystals.

Figure 9:
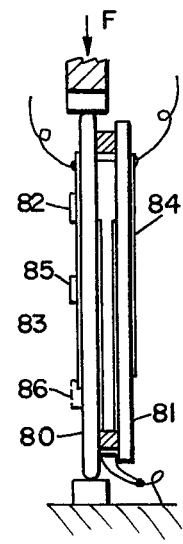

FIG. 9. shows a side elevation of the arrangement of FIG. 8.

Figure 10:
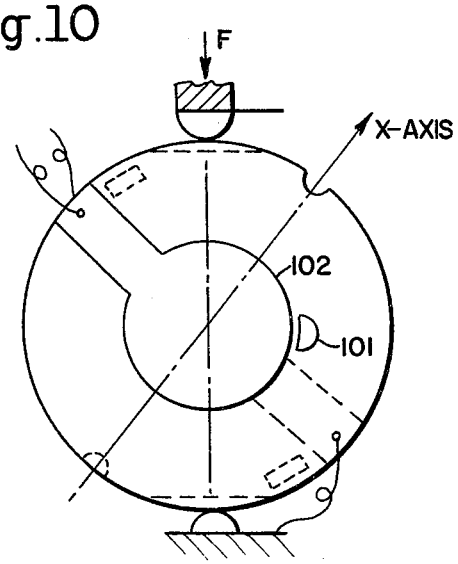

FIG. 10. shows an elevation view of an alternative mass loading arrangement from those shown in FIG. 8.

Figure 11:
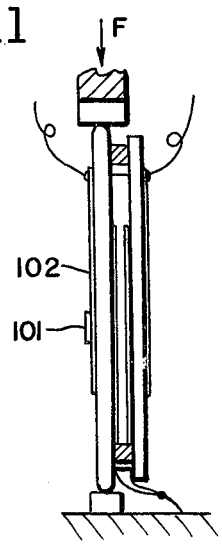

FIG. 11. shows a side elevation of the arrangement of FIG. 10.

Figure 12:
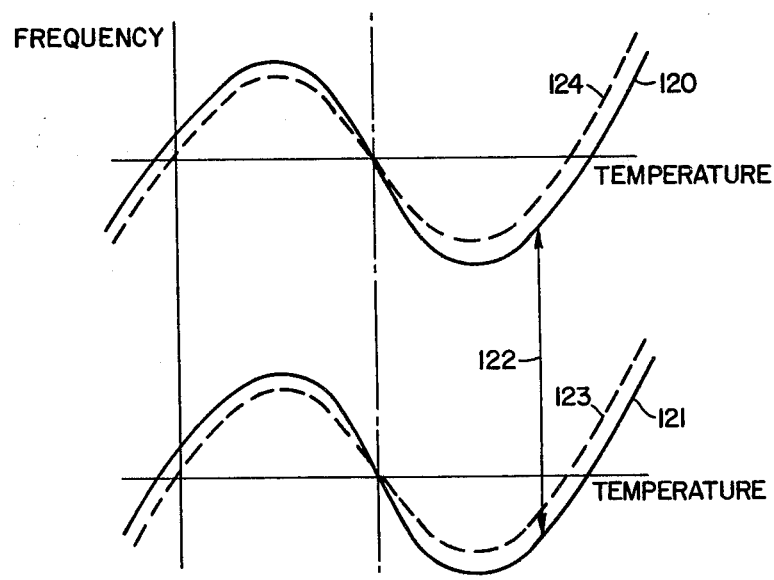

FIG. 12. shows typical frequency versus temperature curves for the crystals.

Figure 13:
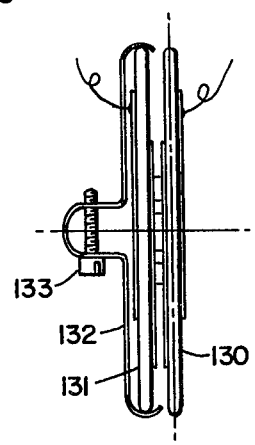

FIG. 13. shows an elevation view taken on A'A of FIG. 13 of a crystal pair, one crystal of which compensates the other with the aid of a compression clip.

Figure 14:
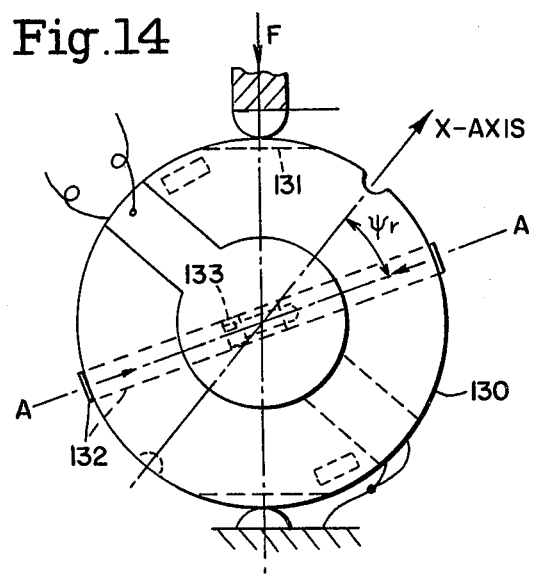

FIG. 14. shows a front elevation of the arrangement of FIG. 13.

Figure 15:
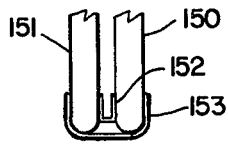

FIG. 15. shows a magnified part side elevation of a pair of crystals secured together by an alternative method employing spring clips.

Figure 16:
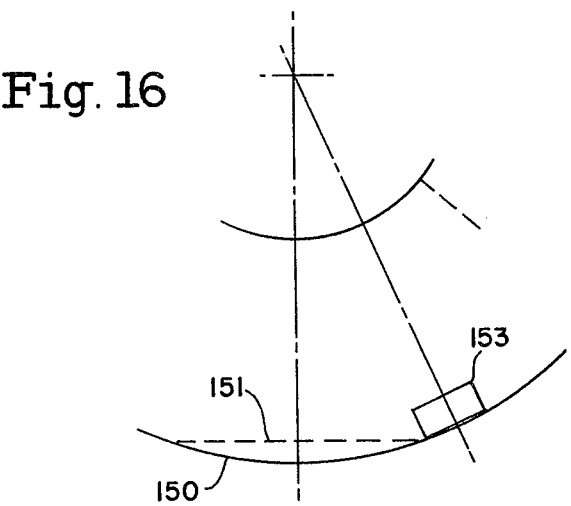

FIG. 16. shows a front elevation of the arrangement of FIG. 15.

FIGS. 1, 2 and 3 are copies of figures contained in patents listed at the outset of this disclosure and are incorporated solely to facilitate explanation of the improvements introduced by the present invention. FIG. 1. is a copy of FIG. 5 of U.S. Pat. No. 3,891,870, FIG. 2. is a part copy of FIG. 4. of U.S. Pat. No. 4,020,448. FIG. 3. is a copy of FIG. 5 of U.S. Pat. No. 4,175,243.

In each of these earlier transducers of present FIGS. 1, 2, and 3 either one or two plate-like crystals 1, 20, 21, and 31, sit upright between pairs of seatings, 2, 3, 22, 23, 32 and 33 of which the lower seating 3, 23 and 33 is secured to the bottom of the instrument housing 4, 20 and 34 and the upper seating 2, 22 and 32 is secured to a stem 5, 27 and 35 fastened to the center of two diaphragms 6, 7, 28, and 29 or at the ends of two cantilevered springs 36 and 37 which are secured to the instrument housing.

These diaphragms or springs ensure that the force F, to be measured, is applied only uni-directionally to the crystal edge.

Particularly in the case of FIGS. 2 and 3 the transducer output resulted from generation of the difference frequency between either the two crystals 20 and 21 of FIG. 2 or the two oscillating portions 38 and 39 of FIG. 3 where special endeavour was made during crystal manufacture to ensure each pair of oscillating portions was matched in frequency change characteristic versus ambient temperature change.

In all of these earlier arrangements it proved somewhat laborious and expensive to ensure that changes of ambient temperature of the instruments did not result in undesirable changes of instrument output signal.

It is the purpose of the present invention to provide improved means of ensuring that the transducer is unresponsive to such ambient temperature changes.

In the earlier transducers described hereto ambient temperature changes could result in both temporary and/or steady-state instrument errors.

Temporary or transient errors resulted primarily because the temperature of the two oscillating crystal portions were not at all times identical. Steady-state errors followed from difficulty in ensuring perfect matching of the pairs of oscillating portions during manufacture of the crystals.

FIG. 4 and 5 show a method of securing two circular plate crystals 40, and 41 very close together by cementing small spacing blocks or shims of material 42 and 43 between the crystal faces.

Crystals 40 and 41 each have on their faces conventional pairs of electrodes 44 and 45 also 46 and 47. To prevent capacitative or other interference between the crystals, ground electrodes 45 and 46 are placed facing one another.

Crystal 40 sits on lower seating 48 and Force F is applied to upper seating 49 via stem 50. This crystal is arranged to have its X-axis set at an angle of approximately 40° to a line joining the two seatings 48 and 49 are explained in detail in my U.S. Pat. No. 3,891,870 to ensure that its frequency versus force behaviour is independant of temperature.

Seatings 48 and 49 may be of the type described in my U.S. Pat. No. 4,126,801, wherein the crystal edge is indented into the rounded seating member.

Referring to FIG. 4, spacing blocks 42 and 43 may be made from ceramic or metal and are located at particular angles with respect to the X-axis in the quartz plate at which angles a force along a diameter in the plate has negligible effect in causing a frequency change of the plate. This ensures that thermal expansion forces and strain forces resulting from compression of crystal 40 will not be transmitted to crystal 41.

FIG. 6 shows a characteristic curve 60 of diametrically applied force versus frequency change of crystal 40 with respect to the applied angle of the force referred to the X-axis. Crystal 41 also has the same characteristic. From curve 60 it is noted that the frequency change effect is zero at an angle $\psi_0$ which is approximately 60°. This occurs at point 61 on the curve.

FIG. 7 shows a preferred transducer embodying the new crystal pair 70 and 71. Connections 72 and 73 to oscillator circuits, not detailed, on circuit board 74 maintain the two crystals in oscillation and additional circuits on the board generate the difference frequency between the crystals. This output signal is available at socket 75.

Crystal 70 sits between seatings 76 and 77. Seating 76 sits on a part of the crystal housing 78. Seating 77 is secured to stem 79 which directs the force F which is to be measured onto the edge of crystal 70. Force F can only act uniaxially on crystal 70 because of the restraint of stem 79 by the two diaphragms 79a and 79b. These diaphragms are pre-stressed to apply a downward securing force $F_p$ on crystal 70 to hold it in its small indents in the seatings 76 and 77 in which its peripheral edges sit. Thus the total force on the edge of crystal 70 is $F_t$ where;

$$F_t = F_p + F$$

Tube 79 enables the enclosure to be either evacuated or filled with an inert gas. Baffle 79 reduces radiant heating of crystal 70 originating from transducer housing wall 79.

It is to be noted that in addition to measuring force F the transducer may alternatively be employed to measure differential fluid pressure P where;

$$P = P_1 - P_2$$

$P_1$ is the fluid pressure on the upper diaphragm and $P_2$ is the pressure on the lower diaphragm.

The effect of securing crystals 70 and 71 together in close proximity in the manner described in the foregoing is to cause the temperatures of the crystals to match each other very closely and it has been found that the crystals may be staisfactorily spaced by only a few thousandths of an inch.

However, the act of placing the crystals close together does not eliminate steady state errors arising from ambient temperature variations of the instrument unless the crystals are prefectly matched in their temperature characteristics as a result of their fabrication.

As it is usually expensive to obtain crystal pairs which are sufficiently well matched that they will form a precision instrument of the type described in the foregoing, it is desirable to provide means to adjust the temperature characteristic of one crystal with respect to the other in order to bring about a good match.

FIGS. 8 and 9 show a method of achieving the required match. This procedure has already been disclosed in my U.S. patent application Ser. No. 264,292 now U.S. Pat. No. 4,376,425, with respect to the transducer claimed in my U.S. Pat. No. 4,175,243. However, the method has equal value with respect to the present invention.

FIG. 8 again shows the arrangement of two crystals 80 and 81 of the form disclosed in FIG. 4. Additionally a small mass 82 is secured to the crystal surface in close proximity to electrode 83.

The way in which mass 82 facilitates matching of the temperature characteristics of crystals 80 and 81 can be better understood by reference to FIG 12 which shows typical frequency versus temperature curves 120 and 121 respectively for the two crystals.

It is to be noted that the frequencies of the two crystals are separated from one another by a small amount, giving the difference frequency 122. The reason for this separation is that the tendency for the oscillations to lock together into a single frequency mode is reduced. Also it is more convenient for signal processing and transmission to have a single frequency. However, it is to be understood that the difference will normally be a minimum consistent with meeting the above requirements. The difference frequency is often achieved in manufacture by plating a small additional amount of electrode metal onto one of the crystal electrodes, for example electrode 84 in FIG. 9. This will cause its frequency to become lower as shown by curve 121 of FIG. 12.

Sometimes, due to imperfections in the crystal material, the the crystal shape, the crystal surface, or electrodes plating uniformity it is found that the two frequencies 120 and 121 of FIG. 12 do not result in a constant difference frequency 122 when the ambient temperature is changed. These imperfections would, for example, cause desired curve 121 to take up the shape of curve 123, thereby creating an undesirable change of the instrument output frequency when the temperature changes.

Provision of mass load 82 on crystal 80 of FIG. 8 causes the characteristic curve 120 of FIG. 12 to take up the shape of curve 124, thus compensating for the mismatch.

The effect of mass 82 is to provide a load on the crystal face which supplies a damping effect to the oscillating electrode 83. This effect is temperature-dependent and thus slightly reduces the natural frequency of oscillation of crystal 80 as the ambient temperature is increased.

The compensating effect is maximum when the compensating mass is secured om the Z-axis of the crystal i.e., at right-angles to the X-axis.

The compensating effect increases both with the amount of the mass 82 and its proximity to the electrode 83.

The mass may touch or overlap 83 as shown at 85.

A second mass 86 displaced 180 from mass 82 may also be employed to enhance the compensation effect.

Yet a further shape of mass which enhances the effect is shown at 101 in FIGS. 10 and 11 where a longer distance of proximity of the moon shape is present with respect to electrode 102.

The mass load may consist of plastic such as epoxy. It may be loaded with metallic powder. The mass may also consist of metal plated onto the crystal. Whatever the material, it may be convenient to provide excessive compensation and then trim a part of the mass or masses off using a laser or other device.

Further, suitable placing and adjusting of one or more masses, may be arranged to control the linearity of the difference frequency versus ambient temperature characteristic of the transducer.

Also, masses placed on crystal 81 of FIGS. 8 and 9 will have a compensation effect which is the reverse of the effect provided by similar masses on crystal 80.

In the same manner that a mass such as 82 in FIG. 8 added to the surface of crystal 80 will facilitate the required compensation, a hole drilled to a given depth in the surface again has the reverse effect and may equally well be employed.

FIGS. 13 and 14 show yet another method of providing compensation by enabling the frequency versus temperature characteristic of one of the two crystals 131 to be adjusted with respect to the other 130. This method was described in my U.S. patent application Ser. No. 310,734, filed Oct. 13, 1981, with respect to a different crystal configuration.

In FIGS. 13 and 14 a spring clip 132 is placed across a diameter of crystal 131 in order to provide a compressional force along that diameter. Reference to FIG. 6 shows that, providing clip 132 is not set at an angle of $\psi_0 = 60°$ to the X-axis, it will cause crystal 131 to have a temperature dependance which follows curve 62 in that figure.

Thus, for example, rotation of clip 123 to a fixed angle $\psi_y$ can be arranged to modify curve 121 of FIG. 12 to take up the shape of curve 123 which is shown dotted. This adjustment can therefore be continued until new curve 123 matches curve 124 and reduces the instrument temperature-dependent error to zero.

The amount of compressive force exerted by spring clip 132 can be adjusted by screw 133 and this adjustment provides an alternative means of setting the amount of compensation to reduce the instrument temperature-dependent error.

Although spring 132 applies a compressive force to the crystal, it will be appreciated that a spring arranged to apply a tensile force across the crystal diameter could equally provide analogous compensation.

FIGS. 15 and 16 show an alternative method of securing the two crystals together to that shown by the cemented blocks 42 and 43 of FIG. 4. Clip 152 spaces crystal 150 and 151 and clip 153 binds the crystals together against 152. An advantage of this arrangement resides in the flexibility of the thin clips 152 and 153. This permits minor movement of one crystal with respect to the other and reduces undesired forces arising from thermal or other effects which might otherwise be transmitted from the one crystal to the other, causing instrument errors.

Another method of providing flexibility of the crystal securings when blocks 42 and 43 of FIG. 4 are employed is to use silicone rubber cement or similar permanently flexible adhesive to secure the blocks to the faces of crystals 40 and 41.

The foregoing methods have been described with reference to the use of the transducer as a force or fluid pressure measuring device. However, it will be appreciated that the force measuring feature of the device could well be employed to create an inertial accelerometer.

Significantly greater loads may be sustained by the new force transducer as shown in FIG. 7 by providing a domed cover on top of the housing as shown in FIG. 5 of U.S. Pat. No. 4,175,243 where the force to be measured is applied to the center of the domed cover and this force is transmitted to the seating members by compression of the transducer housing.

A further feature which may be employed to enhance accuracy is achieved by employing a single oscillator circuit to energize the crystals alternately, each of the two frequencies being stored in a microprocessor unit and subtracted the one from the other to provide the transducer output signal. This eliminates minor differences in oscillator behaviour when ambient temperature varies. The technique was first described with reference to FIG. 5 in my U.S. Pat. No. 4,020,448.

It has also been found that if means are provided to move one of the two seatings away from the center-line of the transducer in a direction parallel to the surface of the crystal sustaining the force, then a line joining the points of contact of the seatings still passes through the center point of the crystal. This technique enables very small non-linearity of the frequency change v.s. force to be corrected. This adjustment was first shown in FIG. 5 of my U.S. Pat. No. 4,126,801 and claimed in claim 6 of that Patent.

FIG. 4 showed spacers 42 and 43 at angles of 60° rotated counter clockwise from the X-axis in crystal 40. It should be pointed out that yet a second pair of spacers could be located at angles of 60° rotated clockwise with respect to the X-axis and these would provide additional support for crystal 41. The reason this second pair of spacers may be employed is because the frequency versus force sensitivity of each crystal is also zero at 60° measured clockwise from the X-axis. This is shown by point 62 on the graph of FIG. 6.

The new transducer may be employed as a linear accelerometer if a mass is secured at the application point of the instrument, and is valuable in this respect because the difference frequency signal originating of the instrument may readily be integrated in a micro processor, thereby providing velocity and distance of travel.

In summary, the present invention described herein has the following advantages over earlier patents, applications and disclosures;

1. Because of the close proximity of the crystals, transient errors due to ambient temperature changes are substantially reduced.

2. Two low-cost standard crystals of the types well-known in the crystal manufacturing industry can be used, whereas some former inventions required specially fabricated crystals.

3. Because circular crystals of conventional design are employed with only a single electrode on each, reduced interference between the oscillations is obtained. This is especially true in relation to my U.S. Pat. No. 4,175,243.

4. Also because of the use of conventional crystals, unwanted modes of oscillation in the crystals due to reflection of accoustic waves from crystal edges is avoided, whereas in certain earlier designs proximity of electrodes to the crystal edge caused undesired reflection of such waves.

5. The crystal which is not located between the seatings changes only negligibly in frequency when force is applied to the crystal secured between the seatings. Thus the amplitude of change of the difference frequency is substantially enhanced in comparison to that obtained particularly in the case of my U.S. Pat. No. 4,175,243.

I claim:

1. A force transducer comprising;
   two plate-shaped piezoelectric crystals having pairs of electrodes disposed on corresponding regions on opposite sides of each crystal, the two crystals arranged to oscillate in the thickness shear mode and being held closely together face-to-face by small spacers secured to them near their peripheries and at positions of minimum frequency versus force response of the crystals, the spacers being of sufficient thickness to prevent the electrodes from touching one another,
   at least two seating members engaging the peripheral edge of one of the crystals and arranged to apply a force directed along a line extending through the plate-like crystal from one seating member to the opposite portion of the peripheral edge,
   means for energizing the electrode pairs to maintain oscillation of each crystal.

2. A force transducer as claimed in claim 1 wherein the spacer is a shim of material.

3. A force transducer according to claim 1 wherein the spacer is a U-shaped metallic strip.

4. A force transducer according to claim 1 wherein a U-shaped clamps are employed to bind the two crystals together.

5. A force transducer according to claim 1 wherein a rubber-like cement is employed to secure the shim or U-shaped members to the crystal.

6. A force transducer according to claim 1 wherein a hard-setting cement is employed to secure the shim or U-shaped members to the crystal.

7. A force transducer according to claim 1 wherein the force is directed from one seating member through the crystal to the other seating member along a line bearing an angle of approximately 35° with the X-axis of the crystal such that the frequency versus force coefficient of the crystal does not change with temperature.

8. A force transducer according to claim 1 wherein the spacers are placed at angles of approximately 60° with the X-axis measured in the plane of the crystal at the crystal center for which value of angles the frequency change versus diametrically applied force is approximately zero.

9. A force transducer according to claim 1 wherein the crystal which is not secured directly by the seatings is arranged to have only a small change in frequency when the crystal secured by the seatings is subjected to a force applied via the seatings and this latter has a at least three times greater change in frequency than the former change of frequency.

10. A force transducer according to claim 1 wherein the difference frequency between the two crystals provides an output of the instrument which is indicative of applied force.

11. A force transducer according to claim 1 wherein at least one of the two crystals has small masses secured to one or more crystal faces in proximity to the electrodes on those faces.

12. A force transducer according to claim 1 wherein at least one of the two crystals has small masses secured to one or more crystal faces the masses overlapping the electrodes on those faces.

13. A force transducer comprising:
   two plate-shaped piezo electric crystals having pairs of electrodes disposed on corresponding regions on opposite sides of each crystal the two crystals being arranged to oscillate in the thickness shear mode and being held closely together face-to-face by small spacers secured to them near their peripheries and at positions of minimum frequency versus force response of the crystals, the spacers being of sufficient thickness to prevent the electrodes from touching one another,
   at least one of the crystals having a spring secured approximately across a diameter to provide a compressional force to the crystal along the direction of the crystal face,
   at least two seating members engaging the peripheral edge of one of the crystals and arranged to apply a force directed along a line extending through the plate-like crystal from one seating member to the opposite portion of its peripheral edge,
   means for energizing the electrode pairs to maintain oscillation of each crystal.

14. A force transducer comprising;
   two plate-shaped piezo electric crystals having pairs of electrodes disposed on corresponding regions on opposite sides of each crystal the two crystals being arranged to oscillate in the thickness shear mode and being held closely together face-to-face by small spacers secured to them near their peripheries and at positions of minimum frequency versus force response of the crystals, the spacers being of sufficient thickness to prevent the electrodes from touching one another,
   at least one of the crystals having a spring secured approximately across a diameter to provide a tension force to the crystal along the direction of the crystal face,
   at least two seating members engaging the peripheral edge of one of the crystals and arranged to apply a force directed along a line extending through the plate-like crystal from one seating member to the opposite portion of its peripheral edge,
   means for energizing the electrode pairs to maintain oscillation of each crystal, 15. A force transducer according to claim 1 wherein not more than one fifth of the total volume of the crystal which is not directly secured between the seatings between the seatings are cut away so that the seatings do not touch that crystal.

16. A force transducer according to claim 1 including a hermetically sealed enclosure surrounding the plate-like crystals in which one or more portions of the enclosure are formed by diaphragms or bellows.

17. A force transducer according to claiom 1 including a rod-like member engaging one of the seating members and a pair of spaced cantilever support springs arranged to restrict the force applied to the rod-like member to the direction parallel to the axis thereof.

18. A force transducer according to claim 1 including a rod-like member engaging one of the seating members and a pair of spaced diaphragms arranged to restrict the force applied by the rod-like member to the direction parallel to the axis thereof.

19. A force transducer according to claim 1 including a rod-like member engaging one of the seating members and a diaphragm spaced from a cantilever arranged to restrict the force applied by the rod-like member to the direction parallel to the axis thereof.

20. A force transducer according to claim 1 wherein a single oscillator is employed with a switching circuit to cause the first and second crystal to be energized into oscillation alternately.

21. A force transducer comprising;
two plate-shaped piezo electric crystals having pairs of electrodes disposed on corresponding regions on opposite sides of each crystal the two crystals being arranged to oscillate in the thickness shear mode and being held closely together face-to-face by small spacers secured to them near their peripheries and at positions of minimum frequency versus force response of the crystals, the spacers being of sufficient thickness to prevent the electrodes from touching one another,
at least two seating members engaging the peripheral edge of one of the crystals and arranged to apply a force directed along a line extending through the plate-like crystal from one seating member to the opposite portion of its peripheral edge,
at least one of the two seatings being adjustable in position tangentially to the crystal edge along a line parallel to the crystal surface so that the seating is offset with respect to the normal center-line of the instrument,
means for energizing the electrode pairs to maintain oscillation of each crystal.

* * * * *